US012004682B1

(12) United States Patent
de Geus et al.

(10) Patent No.: US 12,004,682 B1
(45) Date of Patent: Jun. 11, 2024

(54) COOKWARE SEASONING WIPE

(71) Applicants: Jordan Tyler de Geus, Mercer Island, WA (US); Blaire Lauren Burstein, Mercer Island, WA (US)

(72) Inventors: Jordan Tyler de Geus, Mercer Island, WA (US); Blaire Lauren Burstein, Mercer Island, WA (US)

( * ) Notice: Subject to any disclaimer, the term of this patent is extended or adjusted under 35 U.S.C. 154(b) by 0 days.

(21) Appl. No.: 18/443,507

(22) Filed: Feb. 16, 2024

(51) Int. Cl.
*A47J 36/02* (2006.01)
*A47L 17/08* (2006.01)
*B05D 5/08* (2006.01)

(52) U.S. Cl.
CPC ............. *A47J 36/025* (2013.01); *B05D 5/08* (2013.01); *A47L 17/08* (2013.01)

(58) Field of Classification Search
CPC ........... A47J 36/025; A47J 36/00; B05D 5/08; B05D 5/00; B05D 5/083; A47L 17/08
USPC ............................... 401/196, 216; 15/104.93
See application file for complete search history.

(56) References Cited

U.S. PATENT DOCUMENTS

| 6,916,382 B1 | 7/2005 | Aldredge | |
| 2014/0234534 A1* | 8/2014 | Fish | C09D 183/16 |
| | | | 427/163.1 |

FOREIGN PATENT DOCUMENTS

WO 2004078008 B2 9/2004

* cited by examiner

*Primary Examiner* — David J Walczak
(74) *Attorney, Agent, or Firm* — Carson Patents; Gregory D Carson

(57) ABSTRACT

A cookware seasoning wipe made of a natural or synthetic fabric for conditioning cast iron cookware and steel cookware to create a nonstick surface. Specifically, the present invention refers to a pre-impregnated "wipe" that releases a mix of oils and waxes to the cookware surface, that when heated, polymerizes to create a durable nonstick-like surface, commonly referred to as "seasoning" the cookware. When used to season cookware, the user wipes the surface of the cookware when heating, which naturally releases a thin, even layer of the oil and wax. This process ensures the optimal amount of oil and wax to polymerize and properly protect the cookware's surface. Overall, this is a superior seasoning method because the user no longer has to decide what to use, when to apply it, and how much is needed, all while reducing waste.

9 Claims, 1 Drawing Sheet

COOKWARE SEASONING WIPE

CROSS-REFERENCE TO RELATED APPLICATIONS

This application claims benefit under 35 U.S.C. § 119 to provisional patent application No. 63/511,751.

BACKGROUND OF THE INVENTION

Technical Field

This invention relates generally to a seasoning natural or synthetic wipe for conditioning cast iron cookware prior to use. This invention relates more particularly to a natural or synthetic wipe for conditioning cast iron cookware to create a nonstick surface.

This invention relates generally to a seasoning natural or synthetic wipe for conditioning steel cookware prior to use. This invention relates more particularly to a natural or synthetic wipe for conditioning steel cookware to create a nonstick surface.

The present invention relates to a piece of fabric, made of natural or synthetic material, hereinafter referred to as the "wipe", designed for cooking surfaces such as cast iron and steel cookware. Specifically, the present invention refers to a pre-impregnated "wipe" that releases a mix of oils and waxes to the cookware surface, that when heated, polymerizes to create a durable nonstick-like surface hereinafter referred to "season" or "seasoning". The size and shape of the wipe is subject to change depending on product packaging and manufacturing. It may also be perforated, pre-cut, folded, or any combination thereof.

Background Art

There is a wipe pad for cleaning debris from a cooking grate while preparing the cooking grate for use in cooking foods, in which the wipe pad has a sheet of an absorbent fire retardant material with a cooking agent received by the sheet. This sheet, being attached to a grill brush by a plurality of bristles extending therefrom and partially penetrating the sheet, clings to the grill brush for wiping contact of the sheet against the grate upon movement of the grill brush to clean cooking debris from the cooking grate while communicating a film of the cooking agent from the sheet to prepare the cooking grate for use. A method of preparing a cooking grate for cooking is disclosed.

The wipe pads are specifically designed for cleaning cooking grills and preparing them for use in cooking foods. They address the need to clean debris, such as burnt food particles, carbon deposits, and other residues, from cooking grates prior to cooking. It also aims to facilitate the application of a cooking agent, such as vegetable oil, to the cooking surface of the grill.

The existing art focuses exclusively on barbecue grilling grates. The products are specifically designed to be used before cooking on a barbecue. It involves attaching a wipe comprising rayon, aramid fibers, and cellulose materials to a standard barbecue brush. This combination is used to scrub the surface of the barbecue grate. The wipe pad contains an impregnated oil liquid solution that is released onto the grate during the cleaning process, leaving behind an oil residue. This residue acts as a release agent when users cook on the grill. The product is meant to be used right before the user intends to cook on the barbecue.

On the other hand, the invention described here is designed for use with all types of cast iron and steel cookware. The wipe is designed to be used after the user has cleaned the cookware. The invention involves applying a solution to the surface of the cookware while it is being heated. As the solution is heated, it polymerizes, creating a protective layer on the cookware's surface.

Cast iron and steel cookware requires a "seasoning", which is a layer of oil that has gone through a process called polymerization. Polymerization occurs when the oil or fat has been heated and the small molecules (also known as monomers) of the unsaturated fats combine and chemically link together to create longer chain polymers. This polymerization that occurs on the surface of the cookware provides the nonstick-like surface. Without a properly seasoned surface, the surface will not function like other nonstick cookware. Seasoning also prevents rust and prolongs the life of the cookware.

Home chefs and cooks often do not understand how polymerization works and often do not know or understand what kind of oils are best to use to create a durable polymerized surface. Chefs and home cooks often follow old outdated information regarding what types of oils or animal fats used to season the cookware. This in turn yields sub-par results for polymerization as well as creating and maintaining the nonstick surface. Currently, there is not a product on the market that allows an easy and convenient way to season cast iron or steel cookware.

Cast iron and steel cookware (pots, pans, baking dishes, griddles, grates, etc.) often require regular seasoning to maintain their nonstick-like surface as well as to prevent rusting. Traditional seasoning methods involve applying oil or fat to the surface of the cookware and heating. It is most common for users to heat the cookware in the oven for up to an hour and then naturally cool before repeating the process many times to build up the surface of the "seasoning". Alternatively, some users first apply the oil/fat, then heat their cookware on the stove top for an undefined amount of time. Regardless of heating methods, it often can be confusing, messy, time consuming, non-consistent, and wasteful following a process that sometimes works, or sometimes does not. Using excessive oils or fats, heating for too short of time, or using the wrong oils/fats are problematic to creating or maintaining a durable seasoning finish. It can also be wasteful as users often use multiple paper towels or rags for a single seasoning session.

In light of the foregoing prior art, there is a need for a pre-seasoned wipe to better prepare cast iron and/or steel cookware before use in cooking.

BRIEF SUMMARY OF THE INVENTION

A material designed as a wipe, impregnated with oils/waxes for cookware seasoning, is an innovative solution that simply and consistently forms a "seasoning" on various types of cookware. The wipe is pre-impregnated with a combination of proprietary food grade oils and waxes, which are evenly distributed throughout. When used to season cookware, the consumer wipes the surface of the cookware when heating, which naturally releases a thin, even layer of the oil and wax. This process ensures the optimal amount of oil and wax to polymerize and properly protect the cookware's surface. Overall, this is a superior seasoning method because the consumer no longer has to decide what to use, when to apply it, and how much is needed, all while reducing waste.

According to a first aspect of the invention, there is a cookware seasoning wipe comprising a wipe having a surface of at least eight square centimeters, a food grade oil infused, soaked, and/or steeped onto said wipe permeating said surface of said wipe, and a food grade wax infused, soaked, and/or steeped onto said wipe permeating said surface of said wipe.

According to a second aspect of the invention, there is a cookware seasoning wipe comprising an essential oil infused, soaked, and/or steeped onto said wipe permeating said surface of said wipe.

According to a third aspect of the invention, there is a cookware seasoning wipe wherein a ratio of said food grade wax to said food grade oil is between 0.1 and 50 percent.

According to a fourth aspect of the invention, there is a cookware seasoning wipe wherein a ratio of said food grade wax to said food grade oil is 20 percent of said food grade wax to 80 percent of said food grade oil.

According to a fifth aspect of the invention, there is a cookware seasoning wipe wherein said wipe is comprised of a natural material.

According to a sixth aspect of the invention, there is a cookware seasoning wipe wherein said wipe is comprised of a synthetic material.

According to a seventh aspect of the invention, there is a method of using a cookware seasoning wipe to condition a cooking surface of a cast iron pan or a steel pan comprising washing said cast iron pan or said steel pan, rinsing said cast iron pan or said steel pan, drying said cast iron pan or said steel pan, heating said cast iron pan or said steel pan to at least 100 degrees celsius, rubbing a cookware seasoning wipe over said cooking surface to distribute a food grade oil and a food grade wax combination over said cooking surface, continuing to heat said cast iron pan or said steel pan until said food grade oil and said food grade wax combination begins to cause and/or precipitate smoke coming from said cooking surface, stopping heating said cast iron pan or said steel pan, and allowing complete cooling of said cast iron pan or said steel pan.

According to an eighth aspect of the invention, there is a method of using a cookware seasoning wipe comprising disposal of said cookware seasoning wipe after said rubbing step.

According to an ninth aspect of the invention, there is a method of using a cookware seasoning wipe comprising baking said cast iron pan or said steel pan in an oven between 170-230 degrees Celsius for a minimum of 1 hour before allowing complete cooling.

The present invention, a wipe impregnated with oils and wax for cookware seasoning offers the following advantages:

Convenience: The pre-soaked wipes eliminates the need for measuring, handling the oils and wax individually, and simplifies the seasoning process for professionals and consumers regardless of their cooking skills. The measured components reduce the mess of unused oils, produce less waste and ensures an easy and convenient seasoning process.

Portability: The disposable nature of the wipes allows for easy storage and transport, making it ideal for various types of cookware and culinary settings.

Consistent Seasoning: The wipes design ensures an even distribution of oils and wax, resulting in a reliable and effective seasoning layer on the cookware.

The invention will now be described, by way of example only, with reference to the accompanying drawings in which:

DETAILED DESCRIPTION OF THE INVENTION

Figure 1:
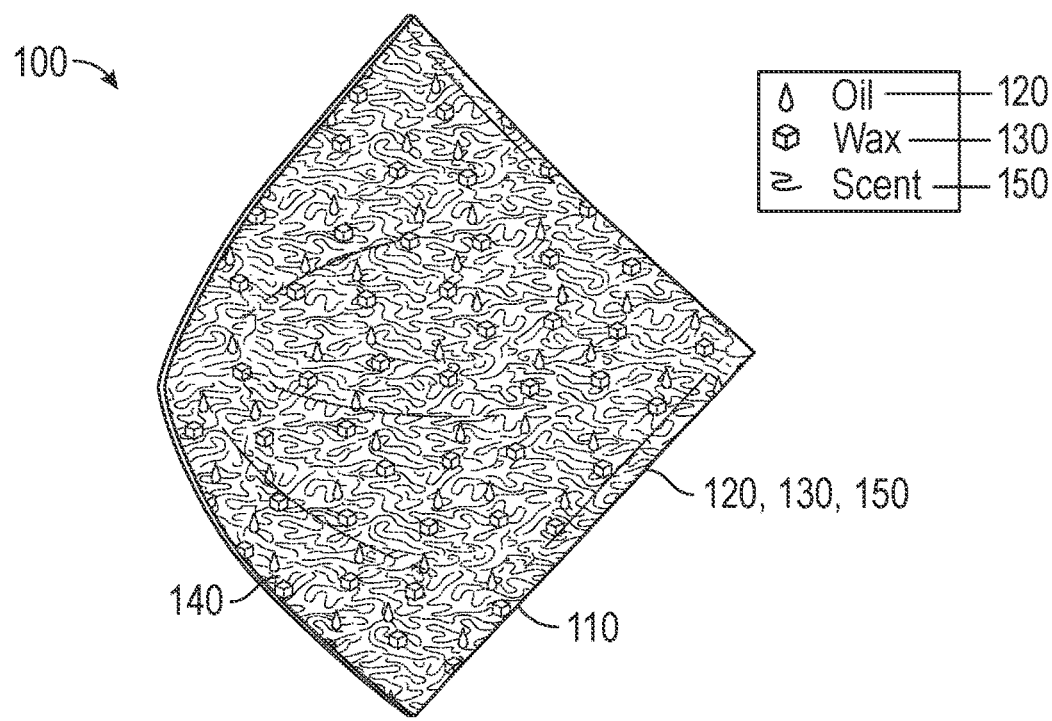
FIG. 1 is a top view of the cookware seasoning wipe with oil, wax, and scent according to the invention.

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Throughout this specification, the phrase "steel cookware" will be understood to imply the inclusion of pans, pots, skillets, woks, etc. that come in various styles and designs, offering different functionalities, aesthetics, and features. There are several types of steel cookware, each with its own composition, characteristics, and uses. Here are some common types:

Stainless steel cookware, composed primarily of iron with chromium and nickel, is known for its durability, rust resistance, and non-reactive nature, making it versatile for a wide range of cooking methods.

Carbon steel cookware, lightweight and quick to heat, forms a natural non-stick surface when seasoned, making it ideal for high-heat cooking such as stir-frying.

Cast iron cookware, made predominantly of iron, excels in heat retention and even heating, developing a non-stick surface with seasoning over time.

Carbon steel woks, similar to carbon steel cookware, are prized for their lightweight design and excellent heat distribution, making them essential for stir-frying.

Blue steel cookware, with a blueish tint, offers good heat retention and is often favored in professional kitchens, particularly in Asian cuisine.

Clad stainless steel cookware features layers of different materials, combining the durability of stainless steel with the superior heat conductivity of materials like aluminum or copper.

Carbon-clad stainless steel cookware marries the benefits of carbon steel and clad stainless steel, providing durability, lightness, and efficient heat retention.

Nickel-free stainless steel cookware caters to individuals with nickel allergies while still offering the advantages of stainless steel.

Index of Labelled Features in Figures. Features are listed in numeric order by Figure in numeric order.

Figure 2:
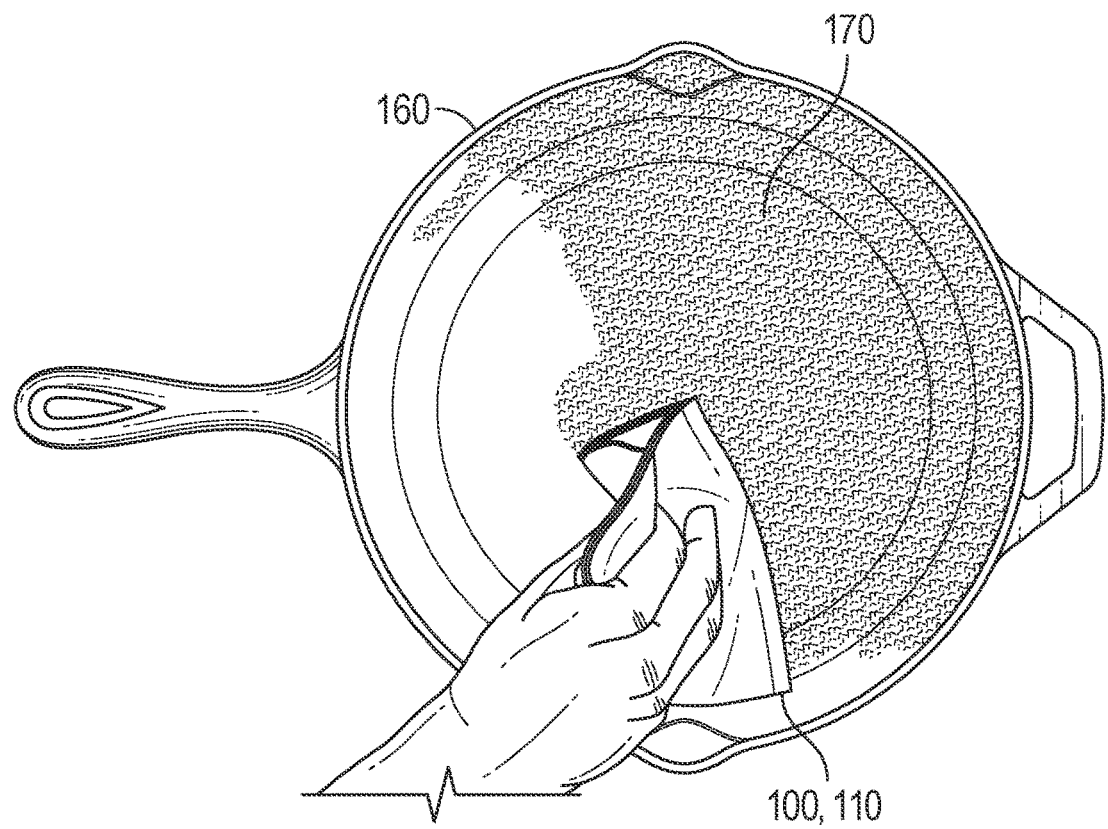
FIG. 2 is a top view of the cookware seasoning wipe being used on a cast iron pan according to the invention.

Referring to the Figures, there is shown in FIGS. 1 and 2 the following features:

Element 100 which is a cookware seasoning wipe.
Element 110 which is a wipe.
Element 120 which is a food grade oil.
Element 130 which is a food grade wax.
Element 140 which is a surface of the wipe 110.
Element 150 which is an essential oil.
Element 160 which is a cast iron pan or a steel pan.
Element 170 which is a cooking surface.

Description: The wipe, infused with proprietary blends of oils and wax for cookware seasoning consists of the following components:

Impregnated Material Designed as a Wipe: Durable, strong, absorbent, compostable food grade material forms the primary substrate of the invention. The material's composition and structure are chosen to ensure optimal absorption and release of the oils and wax. The material will be composed mostly of, but not limited to, a cellulose material, designed to be packaged as a wipe. The actual material may be subject to change based upon a number of factors including composite ratios, existing or new products used in its manufacture, or packaging requirements. Regardless, the invention remains as an impregnated material designed as a wipe for the purpose of cookware seasoning.

Oils: A combination of food grade oils that at a higher temperature begins to emit smoke are used to impregnate the material. The specific oils may include, but are not limited to, vegetable oil, canola oil, or grapeseed oil. The ratios and types of oil blend may change to improve the product.

Wax: A food grade wax is incorporated into the material to aid in the seasoning process as well as its durability. At room temperature the wax aids in suspending and binding the oils into the absorbent material. The wax affords the material from binding to itself and allows users to remove single wipes easily. Suitable waxes may include, but are not limited to, beeswax or soy wax. The ratio of wax can range from 0.1% to 50%.

Scent: The addition of different essential oils can be added to aid in enhancing the scent of the product. This does not affect the polymerization of the oils/waxes and is an optional component.

Usage: To season cookware using the wipes impregnated with oils and wax:

Wash cookware with sponge, chainmail, or any abrasive-like material used for cleaning. If soap was used, rinse cookware thoroughly.

Dry interior and exterior of cookware with towel, paper napkins, cloth or any water absorbing material, or via any source of heating device.

Heat the freshly washed cookware via electric, gas, propane, induction, charcoal or any other means on a medium setting for 2-5 minutes. Surface should be warm to hot. Caution is needed as the surface can potentially cause burns.

Using the wipe, lightly rub the entire interior and exterior surfaces of the cookware using a circular motion ensuring even coverage throughout the bottom, corners, edges, walls, tops and handles (if cast iron or carbon steel). All surfaces should have a glossy like appearance and no dry spots should be present. If a dry spot is present, fold material and wipe the area again.

Dispose of the used wipe. This is 100% compostable.

Continue to heat the cookware until smoking just starts to appear. Turn off heat or remove from heat source, and allow cookware to cool naturally.

In an alternative method, the user can heat the cookware in an pre-heated oven between 170-230 degrees Celsius for a minimum of 1 hour before allowing to cool naturally.

In a preferred embodiment of the invention, there is a cookware seasoning wipe comprising a wipe having a surface of at least eight square centimeters, a food grade oil infused, soaked, and/or steeped onto said wipe permeating said surface of said wipe, and a food grade wax infused, soaked, and/or steeped onto said wipe permeating said surface of said wipe. The wipe can be made of any material that can hold or absorb the oil and wax. The material can be natural or synthetic.

In an alternate embodiment of the invention, there is a cookware seasoning wipe comprising an essential oil infused, soaked, and/or steeped onto said wipe permeating said surface of said wipe. The essential oils to be infused, soaked, and/or steeped onto said wipe are used to impart flavor and scent and can be any combination of essential oils.

In an alternate embodiment of the invention, there is a cookware seasoning wipe wherein a ratio of said food grade wax to said food grade oil is between 0.1 and 50 percent.

In an alternate embodiment of the invention, there is a cookware seasoning wipe wherein a ratio of said food grade wax to said food grade oil is 20 percent of said food grade wax to 80 percent of said food grade oil. Essential oils can also be added with this food grade wax and food grade oil at any other ratios.

In an alternate embodiment of the invention, there is a cookware seasoning wipe wherein said wipe is comprised of a natural material.

In a preferred embodiment of the invention, there is a cookware seasoning wipe wherein said wipe is comprised of a synthetic material.

The wipe of said invention may also be any flat shape other than square. Shapes such as a circle, oval, rectangle, and triangle as well as any others are possible. The size (surface area) and shape of the wipe may depend on product packaging and manufacturing. The wipe may also be perforated, pre-cut, folded, or any combination thereof.

In a preferred embodiment of the invention, there is a method of using a cookware seasoning wipe to condition a cooking surface of a cast iron pan or a steel pan comprising washing said cast iron pan or said steel pan, rinsing said cast iron pan or said steel pan, drying said cast iron pan or said steel pan, heating said cast iron pan or said steel pan to at least 100 degrees celsius, rubbing a cookware seasoning wipe over said cooking surface to distribute a food grade oil and a food grade wax combination over said cooking surface, continuing to heat said cast iron pan or said steel pan until said food grade oil and said food grade wax combination begins to cause and/or precipitate smoke coming from said cooking surface, stopping heating said cast iron pan or said steel pan, and allowing complete cooling of said cast iron pan or said steel pan.

In an alternate embodiment of the invention, there is a method of using a cookware seasoning wipe comprising disposal of said cookware seasoning wipe after said rubbing step. The wipes can be made from any natural or synthetic material and may or may not be recyclable.

In an alternate embodiment of the invention, there is a method of using a cookware seasoning wipe comprising baking said cast iron pan or said steel pan in an oven between 170-230 degrees Celsius for a minimum of 1 hour before allowing complete cooling.

The present invention, a wipe impregnated with oils and wax for cookware seasoning represents a novel and practical solution for simplifying the cookware seasoning process. The wipes convenience, portability, and ability to provide dependable seasoning make it a valuable tool for home cooks and culinary enthusiasts.

The wipe impregnated with oils and wax for cookware seasoning offers the following advantages: convenience; portability, and consistency of seasoning.

Convenience: The pre-soaked wipes eliminates the need for measuring, handling the oils and wax individually, and simplifies the seasoning process for professionals and consumers regardless of their cooking skills. The measured components reduce the mess of unused oils and produce less waste while ensuring an easy to implement and convenient to use seasoning process.

Portability: The wipes of the present invention are small and disposable in nature allowing for easy storage and transport, making it ideal for various types of cookware and culinary settings.

Consistent Seasoning: The wipes design ensures an even distribution of oils and wax, resulting in a reliable and effective seasoning layer on the cookware.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A cookware seasoning wipe comprising
   a wipe having a surface of at least eight square centimeters,
   a food grade oil infused, soaked, and/or steeped onto said wipe permeating said surface of said wipe, and
   a food grade wax infused, soaked, and/or steeped onto said wipe permeating said surface of said wipe.

2. The cookware seasoning wipe of claim 1 comprising an essential oil infused, soaked, and/or steeped onto said wipe permeating said surface of said wipe.

3. The cookware seasoning wipe of claim 1 wherein a ratio of said food grade wax to said food grade oil is between 0.1 and 50 percent.

4. The cookware seasoning wipe of claim 3 wherein a ratio of said food grade wax to said food grade oil is 20 percent of said food grade wax to 80 percent of said food grade oil.

5. The cookware seasoning wipe of claim 1 wherein said wipe is comprised of a natural material.

6. The cookware seasoning wipe of claim 1 wherein said wipe is comprised of a synthetic material.

7. A method of using a cookware seasoning wipe to condition a cooking surface of a cast iron pan or a steel pan comprising
   washing said cast iron pan or said steel pan,
   rinsing said cast iron pan or said steel pan,
   drying said cast iron pan or said steel pan,
   heating said cast iron pan or said steel pan to at least 100 degrees celsius,
   rubbing a cookware seasoning wipe over said cooking surface to distribute a food grade oil and a food grade wax combination over said cooking surface,
   continuing to heat said cast iron pan or said steel pan until said food grade oil and said food grade wax combination begins to cause and/or precipitate smoke coming from said cooking surface,
   stopping heating said cast iron pan or said steel pan, and allowing complete cooling of said cast iron pan or said steel pan.

8. The method of using a cookware seasoning wipe of claim 7 comprising
   disposal of said cookware seasoning wipe after said rubbing step.

9. The method of using a cookware seasoning wipe of claim 7 comprising
   baking said cast iron pan or said steel pan in an oven between 170-230 degrees Celsius for a minimum of 1 hour before allowing complete cooling.

* * * * *